United States Patent
Chen et al.

(10) Patent No.: US 10,892,839 B2
(45) Date of Patent: Jan. 12, 2021

(54) METHOD FOR FAST RECONFIGURATION OF GM CLOCKS IN THE TSN NETWORK BY MEANS OF AN EXPLICIT TEARDOWN MESSAGE

(71) Applicant: SIEMENS AKTIENGESELLSCHAFT, Munich (DE)

(72) Inventors: Feng Chen, Feucht (DE); Jürgen Schmitt, Fürth (DE)

(73) Assignee: SIEMENS AKTIENGSELLSCHAFT, Munich (DE)

( * ) Notice: Subject to any disclaimer, the term of this patent is extended or adjusted under 35 U.S.C. 154(b) by 0 days.

(21) Appl. No.: 16/302,505

(22) PCT Filed: May 19, 2016

(86) PCT No.: PCT/EP2016/061269
§ 371 (c)(1),
(2) Date: Nov. 16, 2018

(87) PCT Pub. No.: WO2017/198304
PCT Pub. Date: Nov. 23, 2017

(65) Prior Publication Data
US 2019/0173596 A1    Jun. 6, 2019

(51) Int. Cl.
*H04J 3/06* (2006.01)
*H04L 29/08* (2006.01)

(52) U.S. Cl.
CPC .......... *H04J 3/0641* (2013.01); *H04J 3/0644* (2013.01); *H04J 3/0667* (2013.01); *H04J 3/0682* (2013.01); *H04L 67/12* (2013.01)

(58) Field of Classification Search
CPC ....... H04L 67/12; H04J 3/0641; H04J 3/0644; H04J 3/0667; H04W 56/001
See application file for complete search history.

(56) References Cited

U.S. PATENT DOCUMENTS 9,973,601 B2 * 5/2018 Spada ............... H04L 69/28
2006/0203851 A1   9/2006 Eidson
(Continued)

FOREIGN PATENT DOCUMENTS

| CN | 102355346 A | 2/2012 |
| WO | 1855433 A | 9/2006 |
| WO | WO 201305356 A1 | 4/2013 |

OTHER PUBLICATIONS

Feng Chen et al:"Support of Automatic Configuration in Working Clocks with Redundancy; as-chen-goetz-sync-redundancy-1115-v01", IEEE802.1 Time Synchronization, IEEE-SA, Piscataway, NJ USA, vol. 802, No. v01; pp. 1-15, XP068101381, Siemens; 2015.

*Primary Examiner* — Phuc H Tran
(74) *Attorney, Agent, or Firm* — Henry M. Feiereisen LLC

(57) ABSTRACT

The invention relates to a method for fast reconfiguration of GM clocks in the TSN network by means of an explicit teardown message. Carrying out a network-wide cleansing of the outdated information ensures that outdated GM information having a higher priority cannot overwrite new information. The current BMCA+ relies on the hold time mechanism in order to quickly carry out the GM reconfiguration on all nodes. The problem is solved by the introduction of a specific advertising schema for the BMCA+ protocol in order to resolve the described instability during the GM reconfiguration period. The method uses an announce+ message for an extra messaging that displays a clock having outdated information and disseminates new information in the complete network. The aim is to inform all clocks that outdated information is present such that the GM reconfiguration can be carried out quickly and without extra conflicts. This so-called "teardown" notification is provided for the case when a current best clock (that is, either a first or (Continued)

second-best GM clock) lowers its priority in order to become a subordinate clock.

7 Claims, 2 Drawing Sheets

(56) References Cited

U.S. PATENT DOCUMENTS

| | | | |
|---|---|---|---|
| 2010/0085990 A1* | 4/2010 | Belhadj | H04J 3/0667 |
| | | | 370/517 |
| 2014/0156892 A1 | 6/2014 | Frodsham | |
| 2014/0281037 A1* | 9/2014 | Spada | H04L 69/28 |
| | | | 709/248 |
| 2016/0309435 A1* | 10/2016 | Song | H04W 56/0015 |
| 2017/0237512 A1* | 8/2017 | Galea | H04J 3/0641 |
| | | | 370/350 |

* cited by examiner

METHOD FOR FAST RECONFIGURATION OF GM CLOCKS IN THE TSN NETWORK BY MEANS OF AN EXPLICIT TEARDOWN MESSAGE

CROSS-REFERENCES TO RELATED APPLICATIONS

This application is the U.S. National Stage of International Application No. PCT/EP2016/061269, filed May 19, 2016, which designated the United States and has been published as International Publication No. WO 2017/198304.

BACKGROUND OF THE INVENTION

Time-sensitive networking (TSN) denotes a series of standards on which the time-sensitive networking task group (IEEE 802.1) is working.

The standards being standardized define mechanisms for transmitting data via Ethernet networks. In this case, a majority of the projects defines expansions of the bridging standard IEEE 802.1Q. These expansions address, in particular, transmission with a very low transmission latency and a high availability. Possible fields of application are convergent networks having real-time audio/video streams and, in particular, real-time control streams which are used for control in the automobile or in industrial plants, for example.

Redundancy is the additional presence of functionally identical or comparable resources of a technical system if these are not required during fault-free operation in the normal case. Resources may be, for example, redundant information, motors, assemblies, complete devices, control lines and power reserves. These additional resources are generally used to increase the fail safety, functional reliability and operational reliability. Redundancy is therefore widespread in industrial communication, in particular in industrial communication networks which require a particularly short "switch-over time" in the event of a fault, that is to say the time needed to change from a primary system to a standby system (in a planned or unplanned manner) in the event of a fault in a component.

The TSN task group is currently working on the revision of the gPTP, that is to say the generalized precision time protocol (IEEE 802.1 AS-2011). One of the fundamental changes in the revised version involves the addition of redundancy support in order to meet the requirements of real-time communication in industrial applications for high-availability time synchronization.

In this case, redundancy can be achieved in gPTP (generalized precision time protocol, IEEE 802.1 AS-2011) networks in various ways.

A PTP network comprises communicating clocks. Of these participating devices, that device which indicates the most exact time is determined using the best master clock (BMC) algorithm. This device is used as a reference clock and is referred to as the grand master clock.

During operation, the master respectively distributes the time signal to its slaves in order to determine the delay. For this purpose, a time stamp in the form of a sync message is sent from the master reference clock to the slave which determines the reception time of the time stamps from its own time. The slave also repeatedly transmits a delay request message to the master, the reception time of which in the master is in turn sent back to the slave as a delay response message.

The master-to-slave delay and the slave-to-master delay are determined from each of the differences between the four time stamps. These values therefore each contain the difference between the two clocks and the message transfer time with opposite signs. The mean value of the two variables therefore provides the directed offset with respect to the master which is finally used to synchronize the slave clock.

The compensation for the transfer times is based in this case on the assumption that the outward and return trips of synchronization messages have identical average transfer times and change only slowly over time. The slave is continuously brought closer to the reference time of the master using a control method. In particular, setbacks in the slave time are thus avoided.

One possibility is now the so-called "master redundancy" which provides two active grand masters (GM). In this case, a synchronized time is published in a parallel manner, with the result that, if one of the two GM clocks fails, the network can still continue to be synchronized by means of the other clock. This method presupposes the selection of two clocks as redundant GMs, in which case the "better" clock typically functions as the primary GM and the second-best clock functions as the hot standby GM.

On the basis of the rapid spanning tree protocol (RSTP), the BMCA stipulates a single GM clock by spanning a tree with the root at the best clock. However, the practice of using the existing BMCA to determine two GMs is considered to be prone to error and also cannot be automated because two BMCA entities must run in different gPTP domains and network management is needed to preconfigure clock attributes in order to guarantee that the selected GMs in the different domains are not the same clock.

A recently filed submission at an IEEE 802.1 standardization meeting relating to gPTP presents a new protocol which shall be called BMCA+ below. BMCA+ supports the selection and maintenance of two best master clocks in a single gPTP domain. It uses so-called peer-to-peer Announce+ messages which contain the best master selection information for the best and second-best clocks. In this case, BMCA+ does not use a spanning tree algorithm based on RSTP, like BMCA. BMCA+ uses the sequence number (SN) and a hold time mechanism in order to avoid loops and detect errors. Dynamic reconfiguration in response to system changes is likewise supported.

Unlike the method based on IS-IS (intermediate system to intermediate system protocol) which receives a complete set of global information in the local databases, the BMCA+ algorithm supports the interchange and storage solely of selected results of the currently two best clocks. The advantage is the reduced data traffic and improved scalability. However, the data interchange scheme of the BMCA+ causes a problem with the stability in the GM reconfiguration if a current GM is downgraded to the subordinate clock again on account of changes in the clock attributes and a new GM clock must be determined in order to replace the previous GM. In this case, the BMCA+ has a conflict of information which results in an excessively long reconfiguration time which is much longer than in other cases.

FIG. 1 shows an example of a run of the BMCA+ protocol in a network having four linearly arranged nodes for selecting the best and second-best clocks as redundant GMs. In this case, the arrow t indicates the passing of time. The horizontal arrows show the transmission of messages between the network elements, including the information contained in the message. The GM reselection is triggered by the currently best clock in the network node A which reduces its priority value from 3 to 8. In this case, the nodes are labeled in FIGS. 1 and 2 as follows: (A3:4) means, for example, clock A with priority 3 and sequence number 4. A transmits an announcement message (Announce+) with A8 as the second-best GM clock. After receiving the change, each node must locally make a reselection and propagate these new selection results.

Unlike the nodes A and B which still consider A8 to be the second-best GM clock, node C will transmit A8 with its own clock (C7:4) in the current GM list and an announcement message without A8. This transaction provokes the next neighbor D which does not know anything about the change to A. The result is that the old values of (A3:4) which are stored in D are not deleted in a promptly overwritten manner and therefore have the opportunity to overwrite the results of the reselection. This data inconsistency is apparent as soon as A finds the old information in the Announce+ message from B.

On the basis of the current BMCA+ protocol, however, A can respond only to B by retransmitting the current results based on BMCA+. However, the conflict is therefore not eliminated. As a result of the conflict between the outdated information and the new information from the same clock, the GM reselection cannot become established as long as the old information (A3:4) is still available in the network. This deadlock is currently intercepted by a timeout, but this takes longer than desired.

As shown in FIG. 1, a timeout event starts this cleansing action for each network node which still has stored the outdated information (A3:4) later in the current solution and prompts the network nodes to definitively select the network node C in the current example as the new GM clock. This presupposes that the time lasts as long as the hold time, the value of which is usually several seconds. The practice of selecting a very much smaller value for the hold time, for example hundreds of milliseconds, can be helpful when reducing the reconfiguration time, but this is at the expense of considerably increased data traffic in the form of periodic Announce+ messages which are transmitted.

SUMMARY OF THE INVENTION

The object of the invention is to solve the problem described.

According to one aspect of the invention, the object is achieved by a method for reconfiguring the information from redundant grand master clocks in the qPTP network by sending a teardown message from one network element to an adjacent network element, which teardown message contains the information which changes at least one of the redundant grand master clocks in the network element of the network.

According to another aspect of the invention, the object is achieved by an apparatus including a network element which is incorporated in a communication network, wherein the communication network operates according to IEEE 802.1 TSN, wherein the network element is able and set up to operate as set forth in a method as set forth above.

BRIEF DESCRIPTION OF THE DRAWING

The present invention will be more readily apparent upon reading the following description of the invention with reference to the accompanying drawing, in which.

DETAILED DESCRIPTION OF PREFERRED EMBODIMENTS

Figure 1:
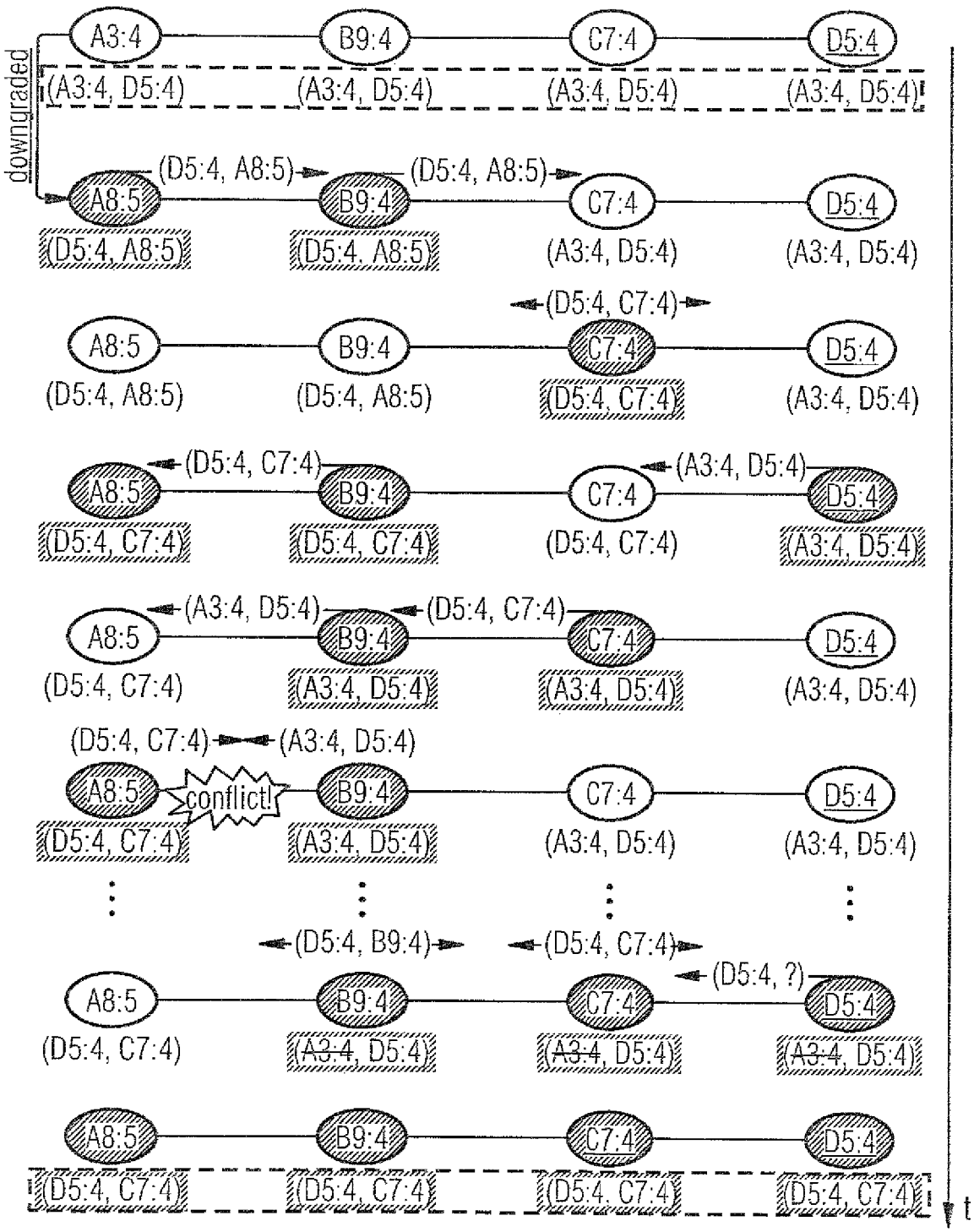
FIG. 1 shows an example of a run of the BMCA+ protocol in a network having four linearly arranged nodes.

The example from FIG. 1 shows that the key to solving the problem is to carry out network-wide cleansing of the outdated information in order to ensure that outdated GM information having a higher priority cannot overwrite new information. The current BMCA+ relies on the hold time mechanism in order to quickly carry out the GM reconfiguration on all modes.

The object is achieved by introducing a specific advertising scheme for the BMCA+ protocol in order to eliminate the described instability during the GM reconfiguration period. The method uses an Announce+ message as an additional notification which indicates a clock having outdated information and disseminates the new information in the complete network. The aim is to inform all clocks that outdated information is present, with the result that the GM reconfiguration can be carried out quickly and without additional conflicts. This so-called "teardown" notification is provided for the situation in which a current best clock (that is to say either the first-best or second-best GM clock) downgrades its priority in order to become a subordinate clock. In other situations in which the best (or second-best) clock increases its priority or a subordinate clock changes its attributes, it is not necessary to send a notification since the described problems will not occur here.

Figure 2:
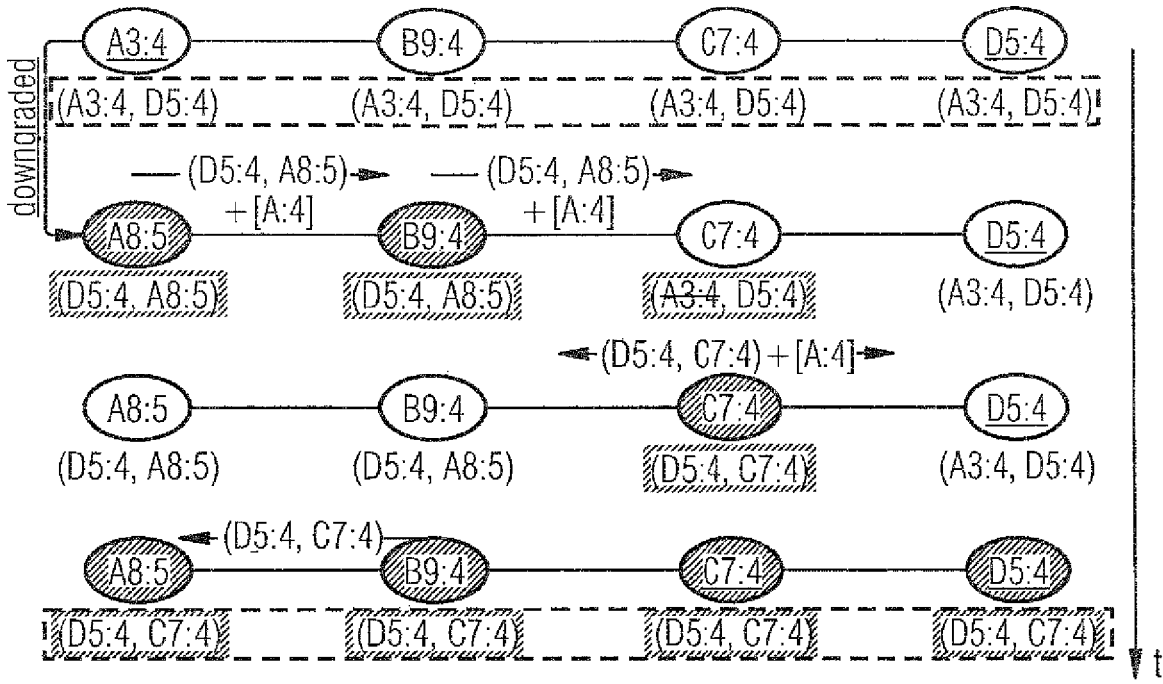
FIG. 2 shows an advertising process based on the network configuration as illustrated in FIG. 1.

FIG. 2 describes the advertising process based on the same network configuration as illustrated in FIG. 1. The downgraded master clock A must first of all send an item of information (teardown) which contains the clock ID and the last serial number SN before the change. A new Announce+ message containing the changed selection results (D5:4, A8:5) and the teardown information (A:4) is then sent.

Instead of sending the complete set of information in this message, for example (A3:4), the minimum of information which suffices to select the superfluous clock information, that is to say the clock ID and SN, is transmitted in the teardown information.

The teardown message can be transmitted as a TLV (type-length-value). The type-length-value format (TLV) is used in network protocols and file formats to transmit a variable number of attributes in a message or file.

An attribute is transmitted by means of the following triplet (type, length, value) at the end of the Announce+ message:

type: determines the type of the attribute
length: determines the transmission length of the attribute
value: contains the actual value of the attribute.

Upon receiving an Announce+ message with the teardown message, each clock must first of all carry out a cleansing action in the local database and must then select the best clock. Each clock must therefore forward the received teardown message in the Announce+ message to the nearest network node together with the updated selection data. A teardown notification is forwarded in an unconditional manner irrespective of whether an intermediate clock detects that, after the values have been updated, that clock which is considered to have been downgraded is still assumed to be one of the two best clocks. For example, in FIG. 2, the network node C has a new selection result without A, but still forwards the values (A3:4) to the neighbor. This behavior ensures that the teardown message is seen by all clocks in the network, with the result that the superfluous information can be completely removed from the network and all network elements.

The transmission of the Announce+ message by BMCA+ uses an SN-based link-local information interchange mechanism in order to circulate, in the network, the information relating to the notification of the best clock in the network, which is likewise used to advertise the teardown notification. The port-based loop prevention action ensures that the same teardown message, characterized by the "clock ID and SN" pair, is transmitted only once via the same data port.

In order to further increase the reliability, a clock which has received the new notification via one of its ports can confirm this receipt by transmitting an Announce+ message to the original transmitter containing the same announce message.

Both network elements at the ends of the connection use such a confirmation message to confirm to one another that they have been notified and now set the advertising of the teardown message in the subsequent Announce+ transmissions via the same link.

The confirmation messages in Announce+ are not contained in FIG. 2.

As shown in FIG. 2, the Announce+ message with the teardown notification is propagated through the entire network. The superfluous best-clock information is gradually deleted from each clock. The described process is advantageously carried out considerably more quickly than that carried out with the prior art as described in FIG. 1. The time for the GM reconfiguration is therefore extremely reduced.

Figure 3:
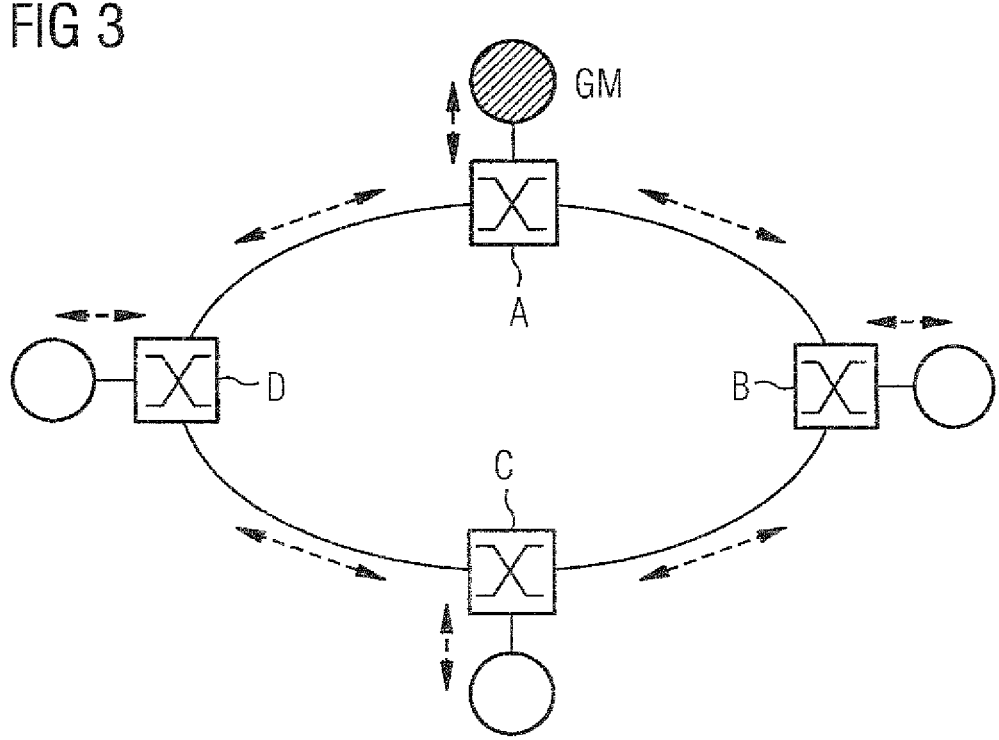

FIG. 3 shows an alternative network structure in order to clarify that the network illustrated in FIGS. 1 and 2 should be understood merely as an example.

The invention claimed is:

1. A method for reconfiguring information from redundant grand master (GM) clocks representing network elements in a gPTP (Generalized Precision Time Protocol) network, the method comprising:
   transmitting a teardown message from one network element to an adjacent network element,
   with information about the redundant GM clocks contained in the teardown message, downgrade at least one of the redundant GM clocks in the network elements of the network to become a subordinate clock,
   after the teardown message is received by the adjacent network element, removing the information contained in the teardown message from a local database of the adjacent network element that received the teardown message, and
   selecting a new best GM clock after the information contained in the teardown message has been removed from the local database.

2. The method of claim 1, wherein the information about the redundant GM clocks contained in the teardown message comprises only a clock ID and a serial number of the downgraded clock.

3. The method of claim 1, wherein the teardown message is transmitted in a type-length-value (TLV) format.

4. The method of claim 1, wherein the teardown message is transmitted only once via each data port of the one network element.

5. The method of claim 1, further comprising acknowledging receipt of the teardown message by sending a confirmation message from the adjacent network element to the one transmitting network element.

6. The method of claim 5, wherein the confirmation message contains a copy of the received teardown message.

7. A gPTP (Generalized Precision Time Protocol) network, comprising:
   a plurality of network elements connected to the network having redundant grand master (GM) docks, with one of the redundant GM docks generating teardown message which comprises a request to downgrade at least one of the redundant GM docks in the network elements of the network to become a subordinate dock,
   wherein the redundant GM dock transmits the teardown message to an adjacent network element and, upon receipt of the teardown message, the adjacent network element removes information about the redundant GM docks contained in the teardown message from a local database of the adjacent network element, and selects a new best GM dock after the information contained in the teardown message has been removed from its local database.

* * * * *

UNITED STATES PATENT AND TRADEMARK OFFICE
CERTIFICATE OF CORRECTION

PATENT NO. : 10,892,839 B2
APPLICATION NO. : 16/302505
DATED : January 12, 2021
INVENTOR(S) : Feng Chen and Jürgen Schmitt Page 1 of 1

It is certified that error appears in the above-identified patent and that said Letters Patent is hereby corrected as shown below:

On the Title Page

Under [73] Assignee: correct the assignee to read --Siemens Aktiengesellschaft--.

Under [56] FOREIGN PATENT DOCUMENTS: Line 2, correct the second listed document to read --CN 1835433 A--.

In the Claims

In Column 6, Claim 7, Lines 28, 29, and 31 replace "docks" with --clocks--.

In Column 6, Claim 7, Lines 32 and 33 replace "dock" with --clock--.

In Column 6, Claim 7, Line 37 replace "docks" with --clocks--.

In Column 6, Claim 7, Line 39 replace "dock" with --clock--.

Signed and Sealed this
Second Day of March, 2021

Drew Hirshfeld
*Performing the Functions and Duties of the
Under Secretary of Commerce for Intellectual Property and
Director of the United States Patent and Trademark Office*